(12) United States Patent  
Hernandez Rivera et al.

(10) Patent No.: US 12,211,317 B2  
(45) Date of Patent: Jan. 28, 2025

(54) HIGHLIGHTING EXPRESSIVE PARTICIPANTS IN AN ONLINE MEETING

(71) Applicant: Microsoft Technology Licensing, LLC, Redmond, WA (US)

(72) Inventors: Javier Hernandez Rivera, Sommerville, MA (US); Daniel J. McDuff, Cambridge, MA (US); Jin A. Suh, Seattle, WA (US); Kael R. Rowan, Box Elder, SD (US); Mary P. Czerwinski, Kirkland, WA (US); Prasanth Murali, Boston, MA (US); Mohammad Akram, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 707 days.

(21) Appl. No.: 17/357,497

(22) Filed: Jun. 24, 2021

(65) Prior Publication Data

US 2022/0358308 A1     Nov. 10, 2022

Related U.S. Application Data

(60) Provisional application No. 63/185,635, filed on May 7, 2021.

(51) Int. Cl.
*G06V 40/20* (2022.01)
*G06N 3/08* (2023.01)
(Continued)

(52) U.S. Cl.
CPC .............. *G06V 40/20* (2022.01); *G06N 3/08* (2013.01); *G06N 7/01* (2023.01); *G06V 20/46* (2022.01);
(Continued)

(58) Field of Classification Search
CPC ...... G06V 40/20; G06V 40/174; G06V 20/46; G06N 7/01; G06N 3/08; H04L 12/1831
See application file for complete search history.

(56) References Cited

U.S. PATENT DOCUMENTS 9,547,908 B1 * 1/2017 Kim .................... G06V 40/162
10,176,365 B1 * 1/2019 Ramanarayanan .... G06V 40/20
(Continued)

FOREIGN PATENT DOCUMENTS

WO     2015199871 A1     12/2015

OTHER PUBLICATIONS

Sun, et al., "How Presenters Perceive and React to Audience Flow Prediction In-situ: An Explorative Study of Live Online Lectures", In Proceedings of the ACM on Human-Computer Interaction, vol. 3, Issue CSCW, Article No. 162, Nov. 7, 2019, pp. 1-19.

(Continued)

*Primary Examiner* — Qun Shen

(57) ABSTRACT

The present disclosure relate to highlighting audience members with reactions to a presenter of an online meeting. Unlike physical, fact-to-face meeting that enables spontaneous interactions among the presenter and the audiences that are collocated with the presenter, presenting materials during an online meeting raises an issue of the present not being able to see real-time reactions or feedback by the audience members. The present disclosure addresses the issue by dynamically determining one or more audience members who indicate reactions during the online meeting or presentation and displaying faces of the one or more audience members under spotlight to the presenter. The presenter sees faces of the audience members with reactions during the online presentation and responds to the audience members and keep the audience engaged. The spotlight (Continued)

audience server analyzes video frames and determines types of reactions of the audience members.

20 Claims, 10 Drawing Sheets

(51) Int. Cl.
    *G06N 7/01*         (2023.01)
    *G06V 20/40*      (2022.01)
    *G06V 40/16*      (2022.01)
    *H04L 12/18*      (2006.01)

(52) U.S. Cl.
    CPC ........ *G06V 40/174* (2022.01); *H04L 12/1831* (2013.01)

(56) References Cited

U.S. PATENT DOCUMENTS

| | | | |
|---|---|---|---|
| 10,311,743 B2* | 6/2019 | Chen | G09B 19/00 |
| 10,713,814 B2* | 7/2020 | De Villers-Sidani | G06V 10/454 |
| 10,943,125 B1* | 3/2021 | Evans | H04N 21/4788 |
| 11,277,597 B1* | 3/2022 | Canberk | G06V 20/20 |
| 11,503,998 B1* | 11/2022 | De Villers-Sidani | G06T 7/70 |
| 11,770,197 B2* | 9/2023 | Zhang | H04B 17/309 382/103 |
| 2011/0263946 A1* | 10/2011 | el Kaliouby | A61B 5/16 600/300 |
| 2014/0201126 A1* | 7/2014 | Zadeh | A61B 5/165 706/52 |
| 2017/0319123 A1* | 11/2017 | Voss | G06V 10/764 |
| 2018/0189691 A1* | 7/2018 | Oehrle | G06N 7/01 |
| 2019/0279393 A1* | 9/2019 | Ciuc | G06T 13/40 |
| 2020/0184278 A1* | 6/2020 | Zadeh | G06N 3/044 |
| 2020/0228359 A1 | 7/2020 | El Kaliouby et al. | |
| 2020/0302187 A1* | 9/2020 | Wang | G06V 20/52 |
| 2021/0076002 A1 | 3/2021 | Peters et al. | |
| 2021/0185276 A1* | 6/2021 | Peters | G06V 20/41 |
| 2022/0284220 A1* | 9/2022 | Wu | G06N 3/088 |

OTHER PUBLICATIONS

Tan, et al., "A real-time Head Nod and Shake Detector using HMMs", In Journal of Expert Systems with Applications, vol. 25, Issue 3, Oct. 2003, pp. 461-466.
Teevan, et al., "Displaying Mobile Feedback During a Presentation", In Proceedings of the 14th International Conference on Human-Computer Interaction with Mobile Devices and Services, Sep. 21, 2012, pp. 379-382.
Tsang, et al., "Boom Chameleon: Simultaneous Capture of 3D Viewpoint, Voice and Gesture Annotations on a Spatially-Aware Display", In Proceedings of the 15th Annual ACM Symposium on User interface Software and Technology, Oct. 2002, pp. 111-120.
Wegge, Jurgen, "Communication via Videoconference: Emotional and Cognitive Consequences of Affective Personality Dispositions, Seeing One's Own Picture, and Disturbing Events", In Journal of Human-Computer Interaction, vol. 21, Issue 3, Sep. 1, 2006, pp. 273-318.
Zettl, Herbert, "Television Production Handbook", In Publication of Cengage Learning, 2011. (No copy available).
Zolyomi, et al., "Managing Stress: The Needs of Autistic Adults in Video Calling", In Proceedings of the ACM on Human-Computer Interaction, vol. 3, Issue CSCW, Article No. 134, Nov. 2019, pp. 1-29.
Zyto, et al., "Successful Classroom Deployment of a Social Document Annotation System", In Proceedings of the SIGCHI Conference on Human Factors in Computing Systems, May 5, 2012, pp. 1883-1892.

"International Search Report and Written Opinion Issued in PCT Application No. PCT/US22/024719", Mailed Date: Jul. 18, 2022, 11 Pages.
"Non-verbal Feedback and Meeting Reactions", Retrieved from: https://web.archive.org/web/20210419004854/https://support.zoom.us/hc/en-us/articles/115001286183-Non-verbal-feedback-and-reactions-, Apr. 19, 2021, 5 Pages.
Akkil, et al., "GazeTorch: Enabling Gaze Awareness in Collaborative Physical Tasks", In Proceedings of the CHI Conference Extended Abstracts on Human Factors in Computing Systems, May 7, 2016, pp. 1151-1158.
Amershi, et al., "Guidelines for Human-AI Interaction", In Proceedings of the CHI Conference on Human Factors in Computing Systems, May 4, 2019, pp. 1-13.
Ames, et al., "Making Love in the Network Closet: the Benefits and Work of Family Videochat", In Proceedings of the ACM Conference on Computer Supported Cooperative Work, Feb. 6, 2010, pp. 145-154.
Barrett, et al., "Emotional Expressions Reconsidered: Challenges to Inferring Emotion From Human Facial Movements", In Journal of Psychological Science in the Public Interest, vol. 20, Issue 1, Jul. 2019, pp. 1-68.
Barrett, Lisaf. , "The Theory of Constructed Emotion: An Active Inference Account of Interoception and Categorization", In Journal of Social Cognitive and Affective Neuroscience, vol. 12, Issue 1, Oct. 19, 2016, pp. 1-23.
Barsoum, et al., "Training Deep Networks for Facial Expression Recognition with Crowd-Sourced Label Distribution", In Proceedings of the 18th ACM International Conference on Multimodal Interaction, Oct. 31, 2016, pp. 279-283.
Bassett, et al., "The Effects of Positive and Negative Audience Responses on the Autonomic Arousal of Student Speakers", In Journal of Southern Speech Communication Journal, vol. 38, Issue 3, Mar. 1, 1973, pp. 255-261.
Bellotti, et al., "Intelligibility and Accountability: Human Considerations in Context-Aware Systems", In Journal of Human-Computer Interaction, vol. 16, Issue 2-4, Dec. 1, 2001, pp. 193-212.
Bickmore, et al., "Virtual Agents as Supporting Media for Scientific Presentations", In Journal of Multimodal User Interfaces, vol. 15, Issue 2, Nov. 6, 2020, pp. 131-146.
Bishop, et al., "A Survey of Counseling Needs of Male and Female College Students", In Journal of College Student Development, vol. 39, Issue 2, Jan. 1998, pp. 205-210.
Boehner, et al., "Affect: From Information to Interaction", In Proceedings of the 4th Decennial Conference on Critical Computing: between Sense and Sensibility, Aug. 20, 2005, pp. 59-68.
Bohus, et al., "Rapid Development of Multimodal Interactive Systems: A Demonstration of Platform for Situated Intelligence", In Proceedings of the 19th ACM International Conference on Multimodal Interaction, Nov. 13, 2017, pp. 493-494.
Box, Harryc. , "Set Lighting Technician's Handbook: Film Lighting Equipment, Practice, and Electrical Distribution", In Publication of Focal Press, 2nd Edition, Jan. 17, 1997. (No copy available).
Braun, et al., "Using Thematic Analysis in Psychology", In Journal of Qualitative Research in Psychology, vol. 3, Issue 2, Jan. 1, 2006, pp. 77-101.
Brush, et al., "Supporting Interaction Outside of Class: Anchored Discussions vs. Discussion Boards", In Proceedings of the Computer Support for Collaborative Learning, Jan. 2002, pp. 425-434.
Chamillard, A.T. , "Using a Student Response System in CS1 and CS2", In Proceedings of the 42nd ACM Technical Symposium on Computer Science Education, Mar. 9, 2011, pp. 299-304.
Daly, et al., "Avoiding Communication: Shyness, Reticence, and Communication Apprehension", In Publication of Hampton Press, 1997. (No Copy available).
Daly, et al., "Correlates and Consequences of Social-Communicative Anxiety", In Publication of Sage Beverly Hills, 1984, pp. 21-71.
Donald, et al., "Fundamentals of TV Production", In Publication of John Wiley & Sons, Jul. 1, 2000.

(56) References Cited

OTHER PUBLICATIONS

Ekman, Rosenberg, "What the Face Reveals: Basic and Applied Studies of Spontaneous Expression using the Facial Action Coding System (FACS)", In Publication of Oxford University Press, 1997. (No Copy available).

Glassman, et al., "Mudslide: A Spatially Anchored Census of Student Confusion for Online Lecture Videos", In Proceedings of the 33rd Annual ACM Conference on Human Factors in Computing Systems, Apr. 18, 2015, pp. 1555-1564.

Haimson, et al., "What Makes Live Events Engaging on Facebook Live, Periscope, and Snapchat", In Proceedings of the CHI Conference on Human Factors in Computing Systems, May 6, 2017, pp. 48-60.

Hassib, et al., "A Design Space for Audience Sensing and Feedback Systems", In Proceedings of Extended Abstracts of the CHI Conference on Human Factors in Computing Systems, Apr. 21, 2018, pp. 1-6.

Hassib, et al., "EngageMeter: A System for Implicit Audience Engagement Sensing Using Electroencephalography", In Proceedings of the CHI Conference on Human Factors in Computing Systems, May 6, 2017, pp. 5114-5119.

Hook, Kristina, "Affective Loop Experiences: Designing for Interactional Embodiment", In Journal of Philosophical Transactions of the Royal Society B: Biological Sciences, vol. 364, Issue 1535, Dec. 12, 2009, pp. 3585-3595.

Hsieh, et al., "Three Approaches to Qualitative Content Analysis", In Journal of Qualitative Health Research, vol. 15, Issue 9, Nov. 2005, pp. 1277-1288.

Khan, et al., "Designing an Eyes-Reduced Document Skimming App for Situational Impairments", In Proceedings of the CHI Conference on Human Factors in Computing Systems, Apr. 25, 2020, pp. 1-14.

Khan, et al., "Spotlight: Directing Users' Attention on Large Displays", In Proceedings of the SIGCHI Conference on Human Factors in Computing Systems, Apr. 2, 2005, pp. 791-798.

Kirschbaum, et al., "The 'Trier Social Stress Test'—A Tool for Investigating Psychobiological Stress Responses in a Laboratory Setting", In Journal of Neuropsychobiology, vol. 28, Issue 1-2, Feb. 1993, pp. 76-81.

Lugo-Fagundo, et al., "New Frontiers in Education: Facebook as a Vehicle for Medical Information Delivery", In Journal of the American College of Radiology, vol. 13, issue 3, Mar. 1, 2016, pp. 316-319.

Macintyre, et al., "The Effects of Audience Interest, Responsiveness, and Evaluation on Public Speaking Anxiety and Related Variables", In Journal of Communication Research Reports , vol. 14, Issue 2, Mar. 1, 1997, pp. 157-168.

Macintyre, et al., "The Effects of Speaker Personality on Anticipated Reactions to Public Speaking", In Journal of Communication Research Reports, vol. 12, Issue 2, Sep. 1, 1995, pp. 125-133.

Mavadati, et al., "Extended DISFA Dataset: Investigating Posed and Spontaneous Facial Expressions", In Proceedings of the IEEE Conference on Computer Vision and Pattern Recognition Workshops, Jun. 2016, pp. 1-8.

McCroskey, et al., "Oral Communication Apprehension", In Publication of Springer, 1986, pp. 279-293.

McCroskey, et al., "Self-Report as an Approach to Measuring Communication Competence", In Journal of Communication Research Reports, vol. 5, Issue 2, Dec. 1988.

McDuff, et al., "A Multimodal Emotion Sensing Platform for Building Emotion-Aware Applications", In the Repository of arXiv:1903.12133, Mar. 28, 2019, 6 Pages.

Miller, et al., "Through the Looking Glass: The Effects of Feedback on Self-Awareness and Conversational Behaviour during Video Chat", In Proceedings of the CHI Conference on Human Factors in Computing Systems, May 6, 2017, pp. 5271-5283.

Motley, Michaelt. , "Public Speaking Anxiety Qua Performance Anxiety: A Revised Model and an Alternative Therapy", In Journal of Social Behavior and Personality, vol. 5, Issue 2, Jan. 1, 1990. (No copy available).

Murali, et al., "AffectiveSpotlight: Facilitating the Communication of Affective Responses from Audience Members during Online Presentations", In Proceedings of the CHI Conference on Human Factors in Computing Systems, May 8, 2021, 13 Pages.

Murali, et al., "Speaker Hand-Offs in Collaborative Human-Agent Oral Presentations", In Proceedings of the 18th International Conference on Intelligent Virtual Agents, Nov. 5, 2018, pp. 153-158.

Parmar, et al., "Making It Personal: Addressing Individual Audience Members in Oral Presentations Using Augmented Reality", In Proceedings of the ACM on Interactive, Mobile, Wearable and Ubiquitous Technologies, vol. 4, Issue 2, Article 55, Jun. 15, 2020, pp. 1-22.

Pellacini, et al., "A User Interface for Interactive Cinematic Shadow Design", In Journal of ACM Transactions on Graphics, vol. 21, Issue 3, Jul. 2002, pp. 563-566.

Picard, et al., "The Galvactivator: A Glove that Senses and Communicates Skin Conductivity", In Proceedings of the 9th International Conference on HCI, Aug. 1, 2001, 6 Pages.

Radbourne, et al., "The Audience Experience: Measuring Quality in the Performing Art", In International journal of arts management, vol. 11, Issue 3, Apr. 2009, pp. 16-29.

Rajcic, et al., "Mirror Ritual: An Affective Interface for Emotional Self-Reflection", In Proceedings of the CHI Conference on Human Factors in Computing Systems, Apr. 25, 2020, pp. 1-13.

Reeves, et al., "The Effects of Screen Size and Message Content on Attention and Arousal", In Journal of Media Psychology, vol. 1, Issue 1, Mar. 1, 1999, pp. 49-67.

Rivera-Pelayo, et al., "Live Interest Meter: Learning from Quantified Feedback in Mass Lectures", In Proceedings of the Third International Conference on Learning Analytics and Knowledge, Apr. 8, 2013, pp. 23-27.

Solina, Franc, "15 Seconds of Fame", In Journal of Leonardo, vol. 37, Issue 2, Apr. 1, 2004, pp. 105-110.

Straus, et al., "The Effects of Videoconference, Telephone, and Face-To-Face Media on Interviewer and Applicant Judgments in Employment Interviews", In Journal of Management, vol. 27, Issue 3, Jun. 1, 2001, pp. 363-381.

\* cited by examiner

| Expressiveness Scores 320 | | | | | | |
|---|---|---|---|---|---|---|
| Audience 322 (Weight value | Smile 324 | Downturned mouth 326 | Mouth open 328 | Brow Furrow 330 | Head-nod 332 | Total 334 | Weighted Average 336 |
| Alice 3 | 5 | 5 | 5 | 3 | 3 | - | - |
| Bob | 0 | 0 | 0 | 0 | 3 | 24 | 6 |
| Charlie | 8 | 0 | 0 | 0 | 0 | 0 | 0 |
| David | 0 | 3 | 2 | 1 | 5 | 42 | 10.5 |
| | | | | 3 | 1 | 37 | 9.3 |

Alice

Bob

Charlie

David

HIGHLIGHTING EXPRESSIVE PARTICIPANTS IN AN ONLINE MEETING

CROSS-REFERENCE TO RELATED APPLICATIONS

This application claims priority to and the benefit of U.S. Provisional Patent Application Ser. No. 63/185,635, filed May 7, 2021, titled "AFFECTIVE ACTIVE SPEAKER SUPPORT SYSTEM," the entire disclosures of which we are hereby incorporated herein by reference.

BACKGROUND

Use of online meetings has become common place as people in remote places collaborate over the network. Types of the online meetings include a presenter making a presentation to audiences. When a presentation takes place where both the presenter and the audience are physically collocated, the presenter usually sees immediate reactions from the audiences as the presenter continues his/her presentation. The presenter then may make adjustments to the presentation based on ongoing reactions by the audience. In contrast, during an online meeting the presenter tends to focus on presentation materials that are displayed on a computer display used by the presenter. The presenter has limited visibility to see the audience during the online presentation because of a limited size of screen display used by the presenter. An issue arises as the presenter does not have an opportunity to see and feel the feedback from the audience during the presentation.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by dynamically highlighting expressive and active participants of an online meeting to the presenter as the presenter makes an online presentation.

An online (i.e., virtual) meeting server controls an online meeting (e.g., online discussion) where a presenter and respective audiences are at remote locations over the network. An online meeting controller starts an online meeting and controls the meeting session by displaying presentation materials and, if space allows, by displaying videos of respective participants on the display screen. An audience video transmitter transmits video data of respective audience participants to a spotlight audience server.

The spotlight audience server analyzes the video data of the respective audience members and determines those who indicate reactions to the presentation to highlight (e.g., place under a spotlight) for the presenter to help the presenter see spontaneous reactions during his/her presentation. Classifications of the video frames with respective audience members' facial expressions use one or more convolutional neural networks for inferring types of reactions. Classifications of the video frames for inferring head gestures use a Hidden Markov Model. The spotlight audience server determines one or more audience members to be under spotlight based on expressiveness scores. The term "expressiveness score" refers to a weighted average score of probabilistic values associated with various types of reactions.

The online meeting server receives information associated with audience for highlighting and updates a display layout of the online meeting screen for the presenter by displaying live video of the audience member under a spotlight. The presenter sees the displayed video of the spotlighted audience as a feedback and reacts to the feedback during the ongoing presentation.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

Figures 4A, 4B:
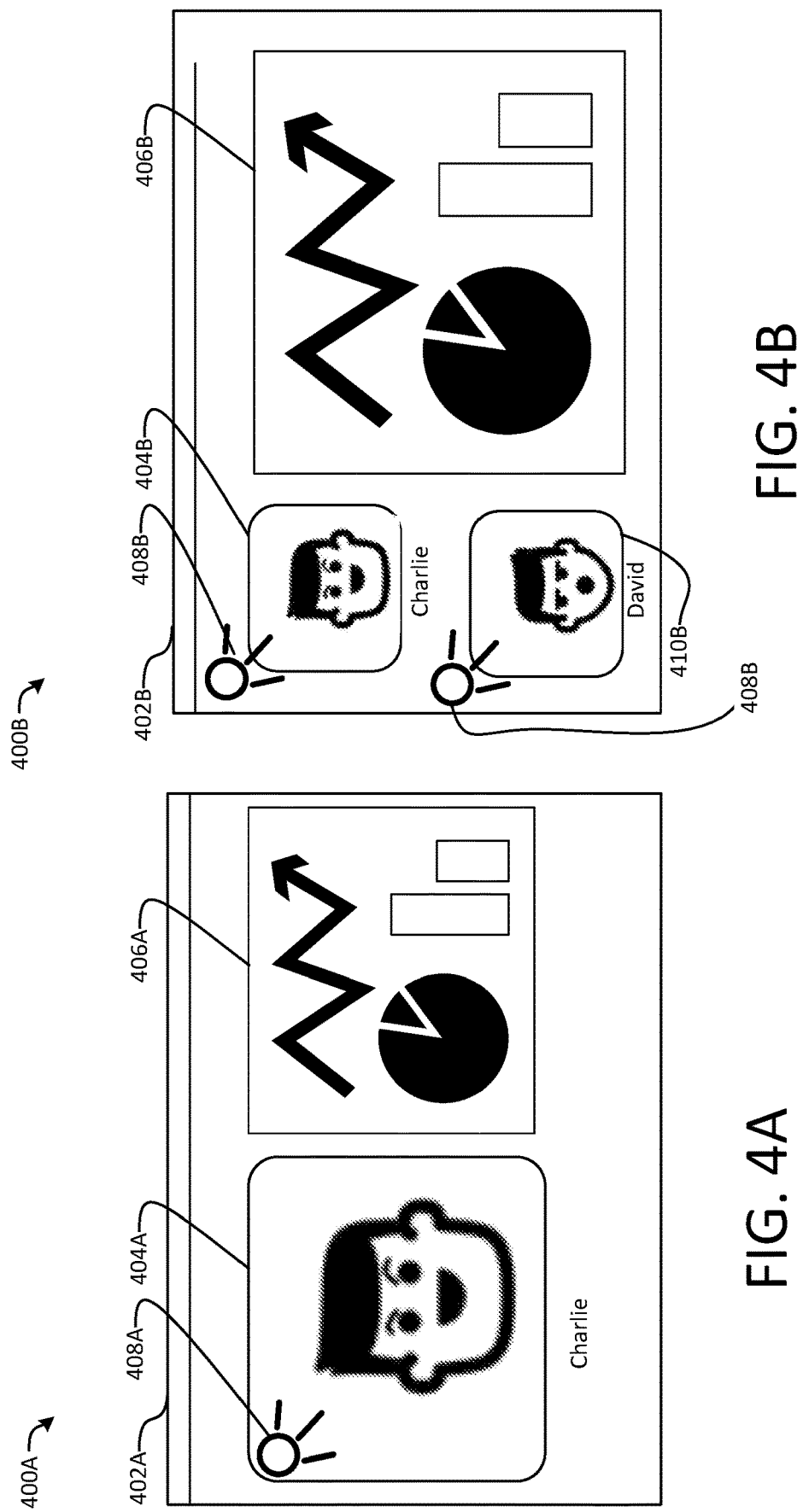

FIGS. 4A-B illustrate examples of screen displays for a presenter of an on line meeting in accordance with aspects of the present disclosure.

Figure 5:
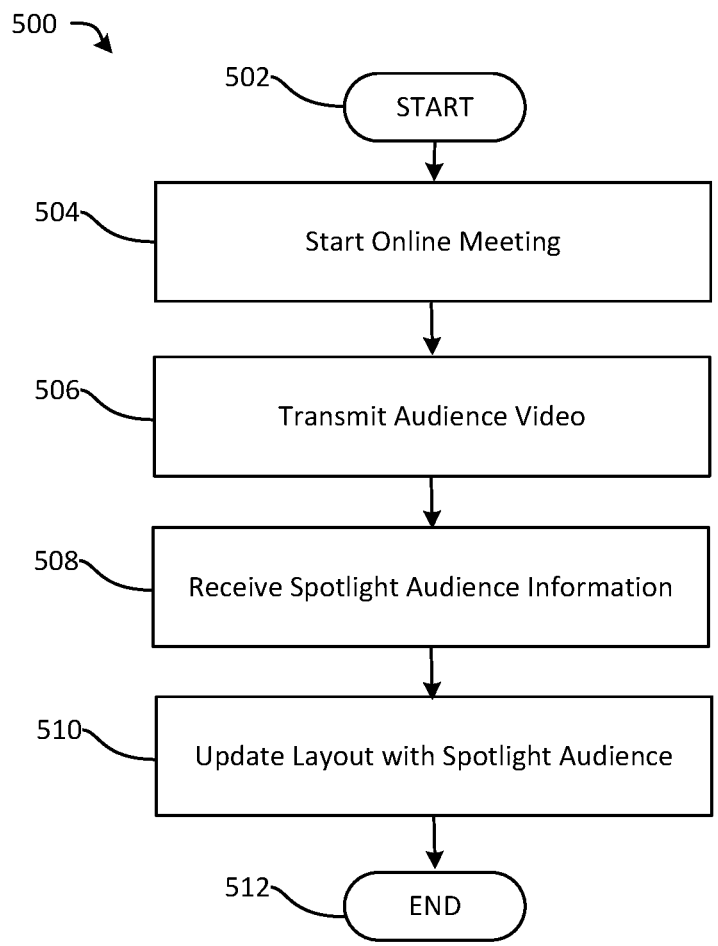

FIG. 5 illustrates an example of a method for highlighting expressive audiences in accordance with aspects of the present disclosure.

Figure 6A:
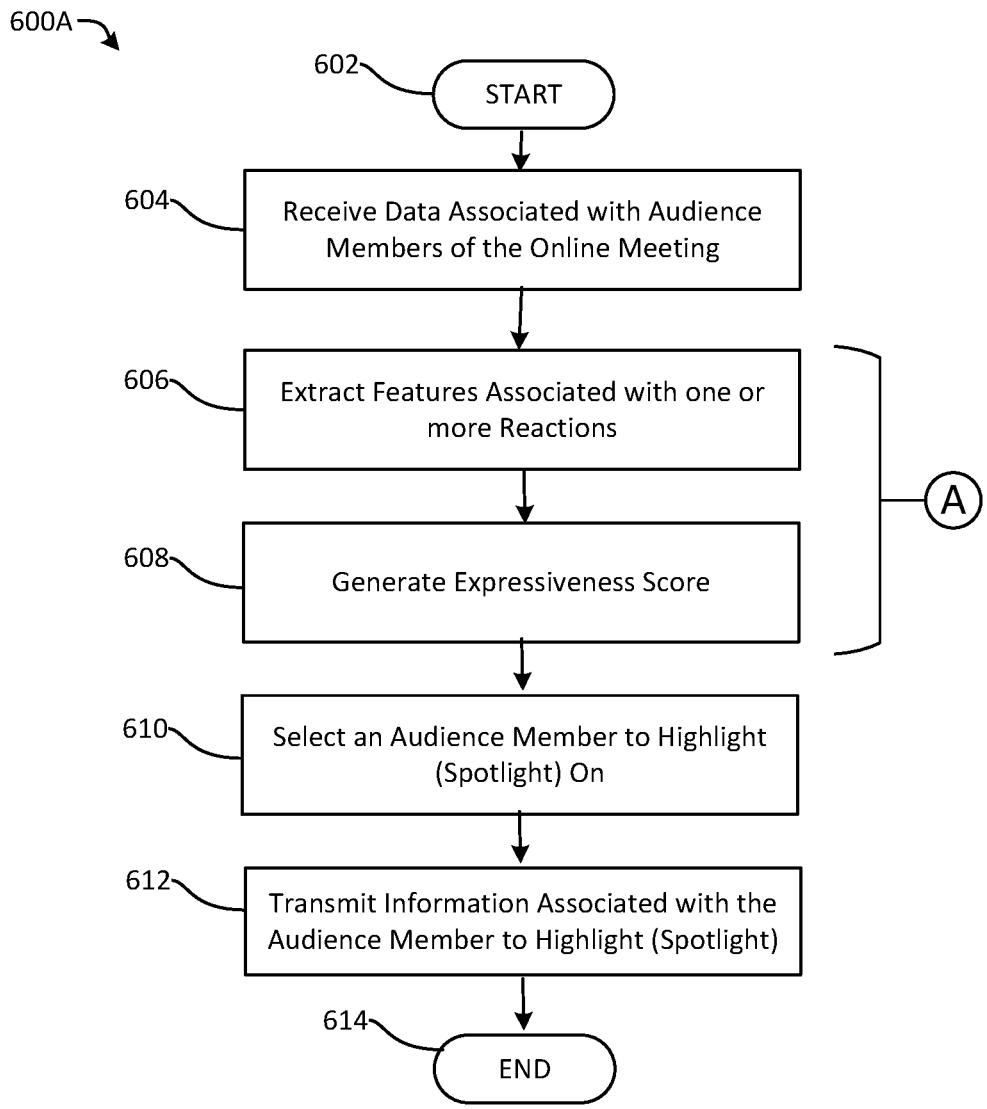
Figure 6B:
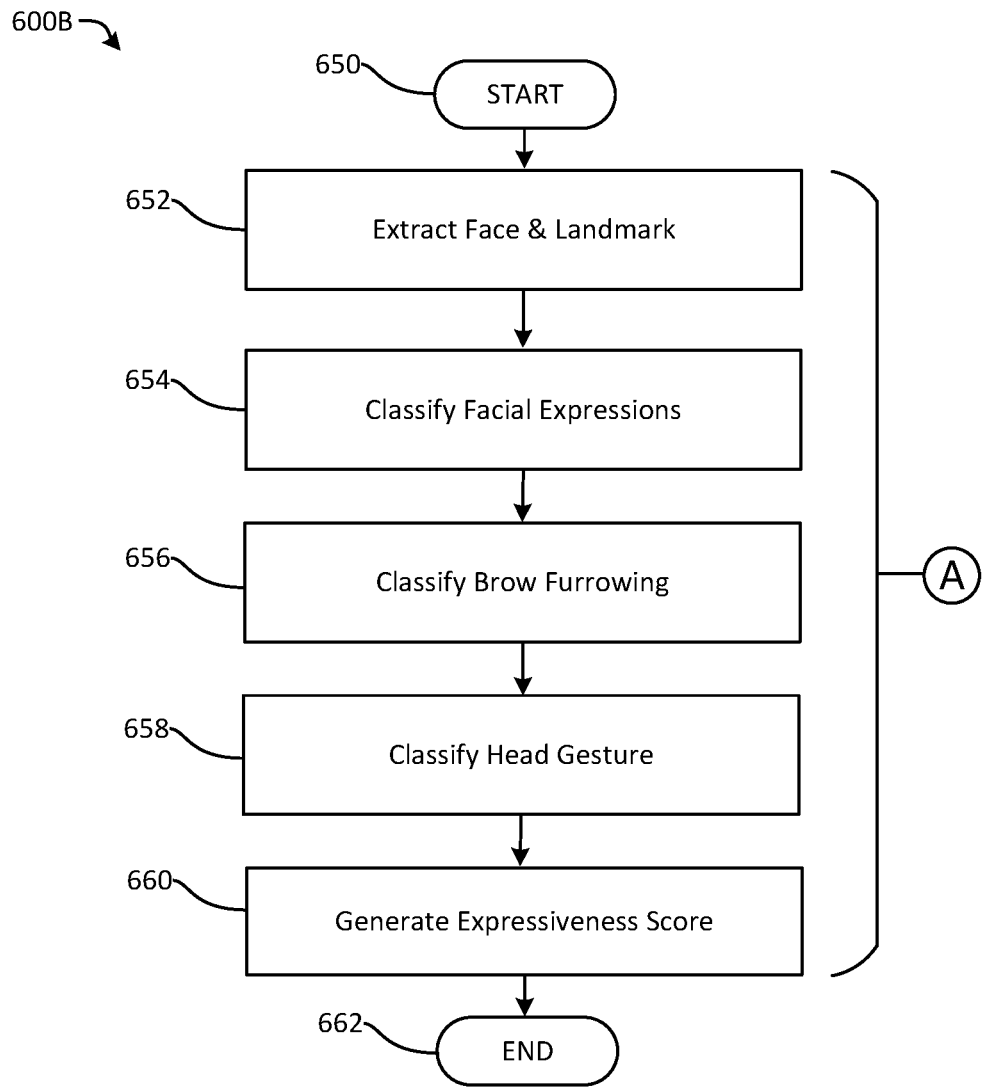

FIGS. 6A-B illustrate examples of methods for highlighting audiences in accordance with aspects of the present disclosure.

Figure 7:
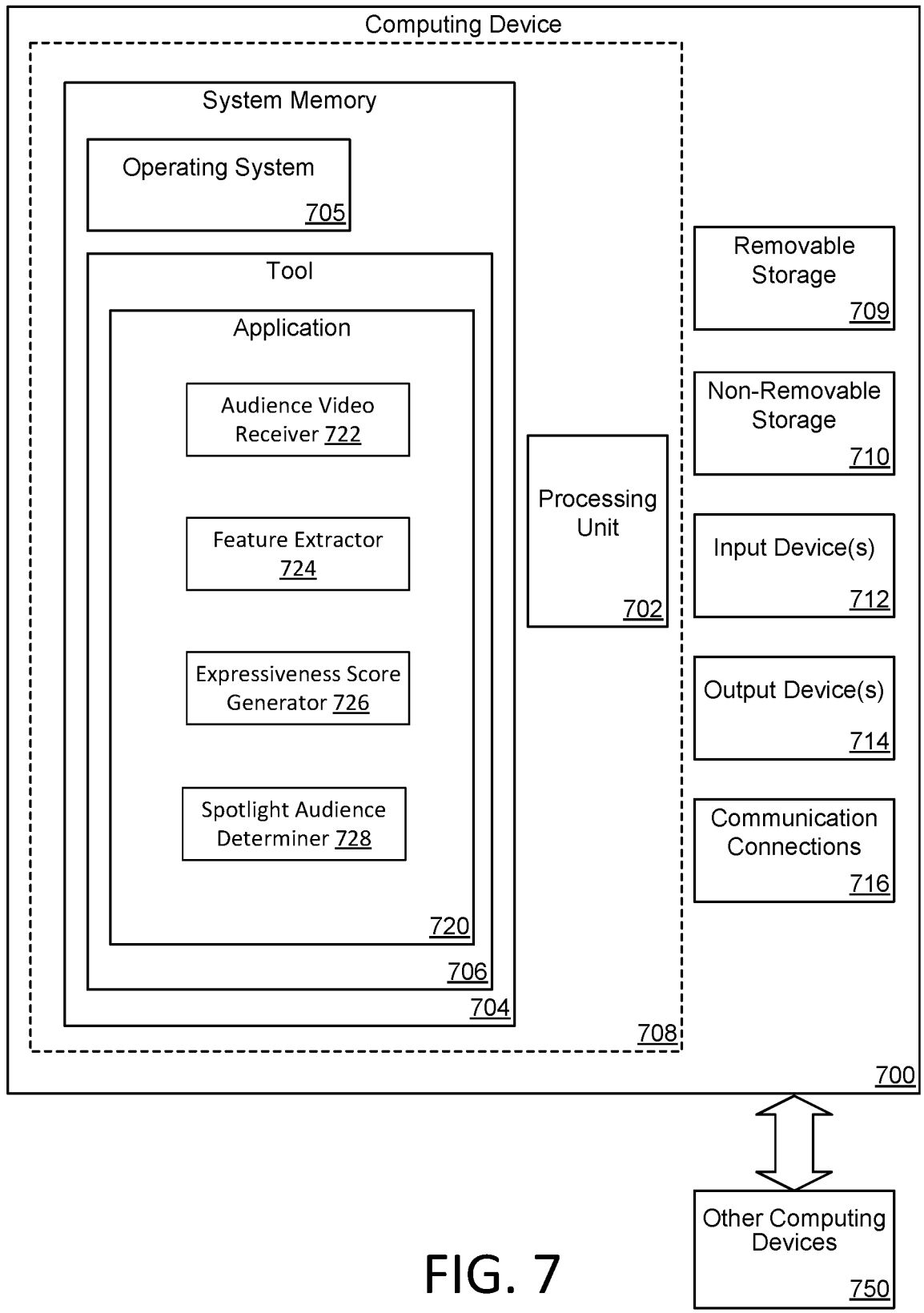

FIG. 7 is a block diagram illustrating example physical components of a computing device with which aspects of the disclosure may be practiced.

Figure 8A:
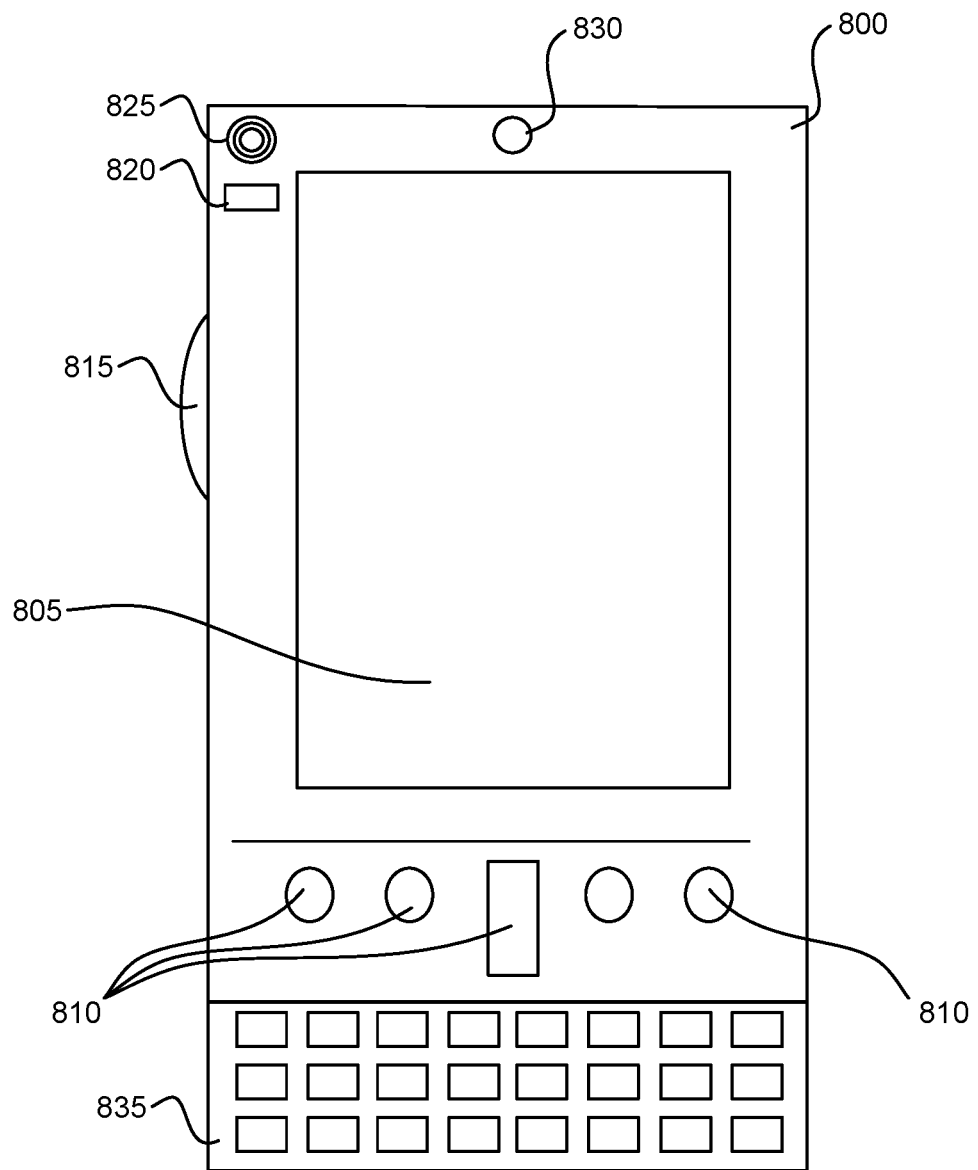

FIG. 8A is a simplified diagram of a mobile computing device with which aspects of the present disclosure may be practiced.

Figure 8B:
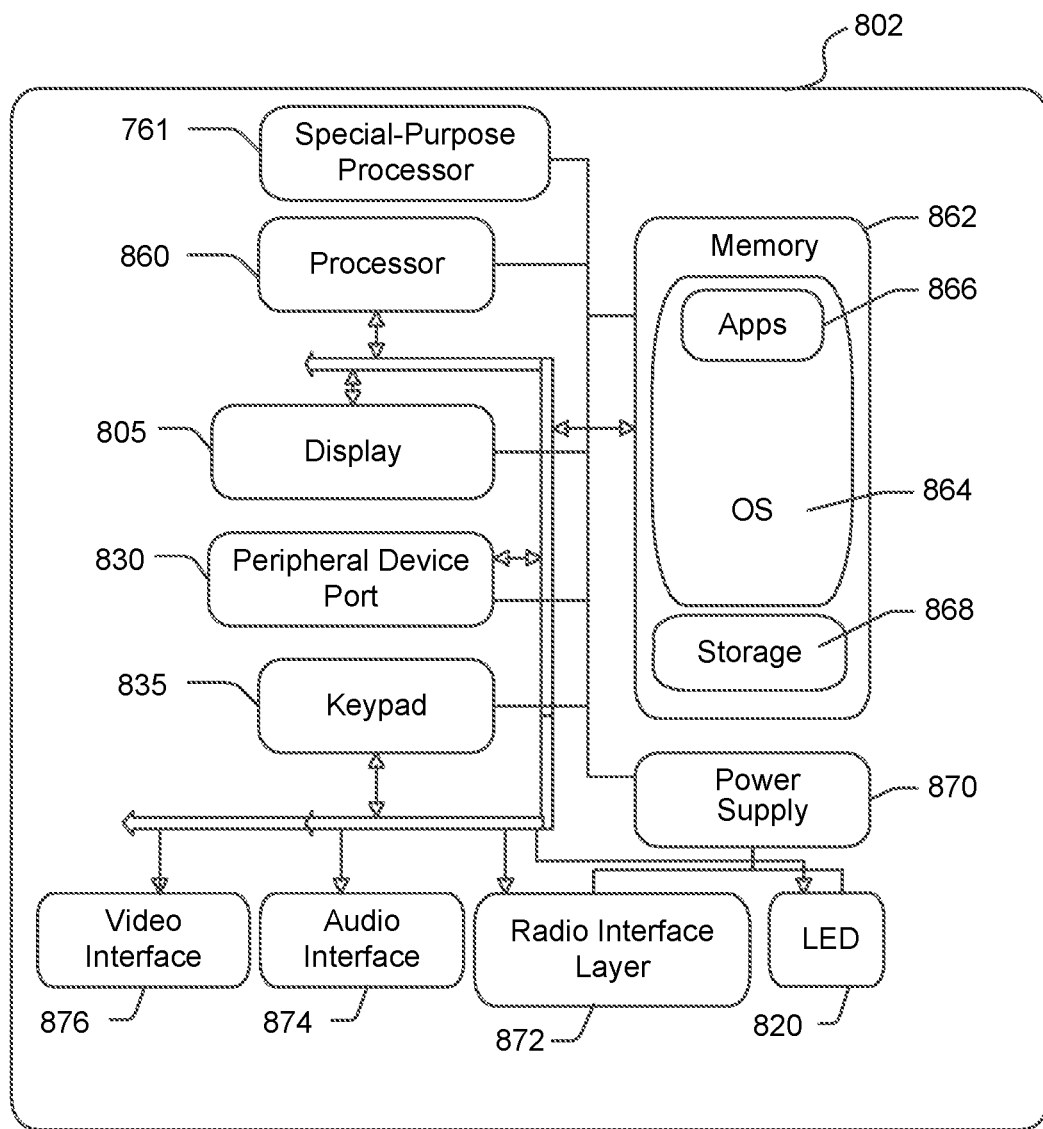

FIG. 8B is another simplified block diagram of a mobile computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Giving presentations to audience is a demanding task for a presenter. Regardless of whether the presentation takes place face-to-face or remotely via online, the presenter needs to continuously gauge audience responses as the presenter presents and intervene as needed to ensure that the presenter conveys the message effectively. For example, some audiences may react by smiling and nodding, possibly conveying to the presenter that the presentation is understandable. Some other audiences may react by looking confused. Yet some other audiences may look emotionless and perhaps bored by the presentation. To make the presentation more effective, the presenter may react to the indications from the audiences by pausing for questions, inserting impromptu jokes, slowing down a pace of talking, repeating key points, skipping sections that are less important to the overarching theme, and the like.

Unlike making presentations to an audience that is physically collocated with the presenter, making spontaneous reactions apparent to the presenter as feedback from the audiences during an online meeting is difficult if not impossible. The issue is at least in part caused by the constraint of traditional video-conferencing platforms. For example, voices and sounds made by the presenter may occupy the audio channel, making it difficult for the presenter to hear subtle reactions by the audiences while making the presentation. A limited size of the display screen for the presenter may prevent the presenter from seeing faces and other verbal queues from the audience while going through slides of the presentation materials.

As discussed in more detail below, the present disclosure relates to highlighting audience members of an online meeting based on expressive responses from the audience members. In particular, the disclosed technology notifies the presenter of a presentation during an online meeting about one or more audience members who are externally expressing feelings or emotions by shedding spotlights in real time. The online meeting server uses a spotlight audience server to do this. The spotlight audience server receives video frames of respective audience members during an online meeting as the presentation takes places, extracts features of facial expressions and gestures (e.g., head gestures) made by respective audience members, generates expressiveness scores for respective audience members, and determines one or more audience members for spotlighting. The online meeting server, in response to receiving the one or more audience members for spotlighting, updates layout of the display screen for the presenter by displaying the audience members.

Accordingly, the presenter may notice the displayed audience members, pause and ask questions to the audience members who look confused under the spotlight, inject some joke when the displayed audience members show signs of boredom, speak more slowly when the audience members look confused, acknowledge resonance with the audience members who look smiley and nodding, and the like.

Figure 1:
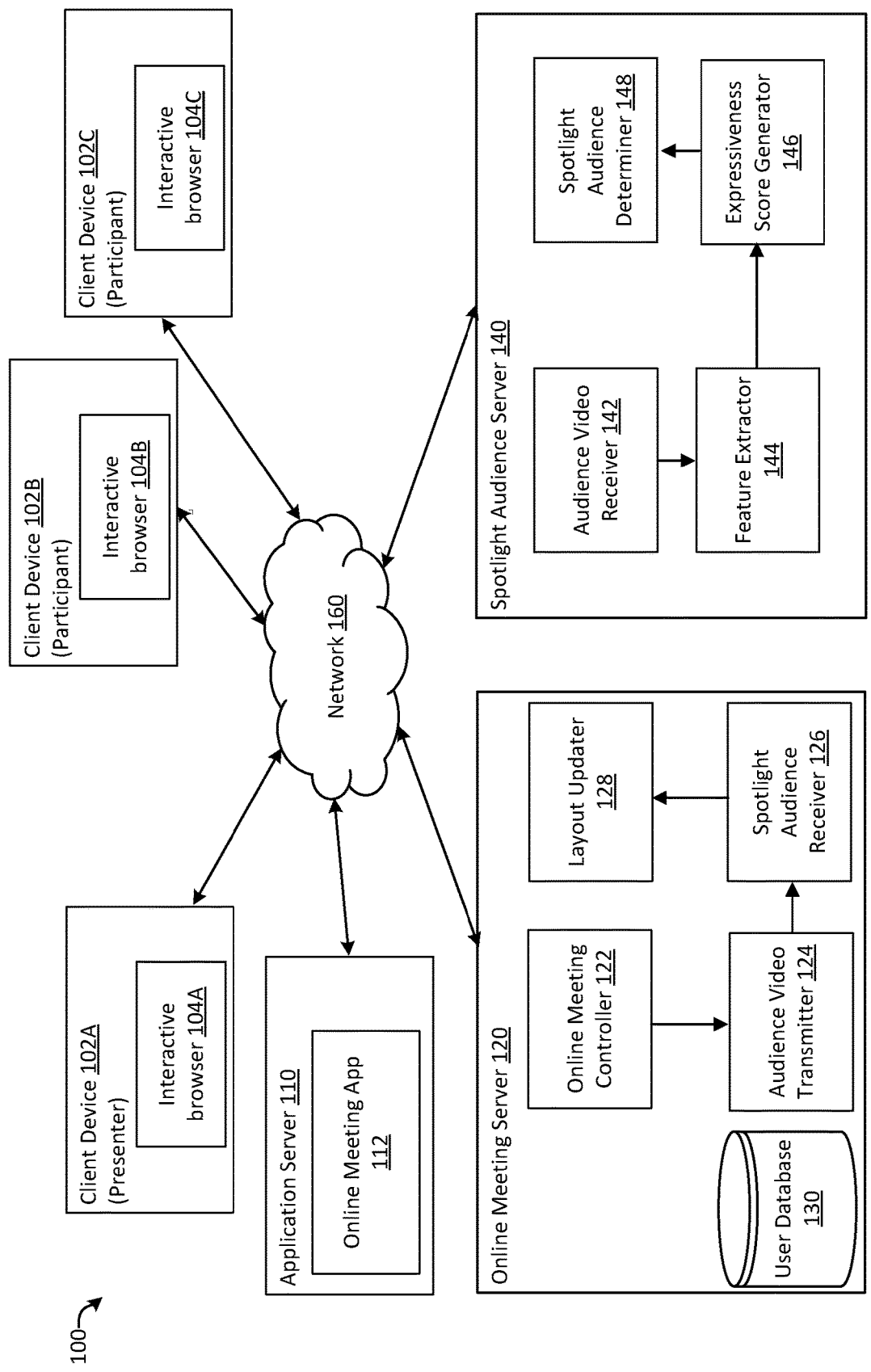
FIG. 1 illustrates an overview of an example system for highlighting expressive audience in accordance with aspects of the present disclosure.

FIG. 1 illustrates an overview of an example system 100 for highlighting expressive audience members in accordance with the aspects of the present disclosure. System 100 includes client devices 102A-C, an application server 110, an online meeting server 120, and a spotlight audience server 140, connected by a network 160. The client devices 102A-C communicate with the application server 110, which includes one or more sets of instructions to execute as applications on the client devices 102A-C. The client device 102A includes an interactive interface 104A. The client device 102A may be for use by a presenter who makes a presentation in an online (i.e., virtual) meeting. The client device 102B includes an interactive interface 104B. The client device 102B may be for use by one of audiences of the online meeting. The client device 102C includes an interactive interface 104C. The client device 102C may be for use by another one of the audience members of the online meeting.

The online meeting server 120 provides online meetings to audiences over the network. The online meeting server 120 at least includes online meeting controller 122, audience video transmitter 124, spotlight audience receiver 126, layout updater 128, and user database 130. The online meeting controller 122 controls sessions of online meetings by admitting hosts, presenters, and the audiences to the online meetings. Controlling sessions includes storing and retrieving user information for respective online meetings from the user database 130, controlling displays of presentation materials and audiences, and controlling video and audio channels for the online meetings over the network. During a session of an online meeting, the audio video transmitter 124 transmits video frames of respective audience members of the online meeting to the spotlight audience server 140 over the network 160. The transmission of the video frames of the audience enables the spotlight audience server 140 to receive the video frames of the audience members for analyzing features of reactions, if any, by one or more audience members of the online meeting.

The spotlight audience receiver 126 receives one or more audience members to spotlight and/or highlight for the presenter during the online meeting. In aspects, the one or more audience members has shown reactions, likely to the presentation, during the online meeting. The spotlighting and/or highlighting the expressive audience member for the presentation may take place in various forms including, but not limited to, displaying live videos of the one or more audience members on the display screen of the presenter. The layout updater 128 updates a layout of the display screen for the presenter by displaying the live videos of the one or more audience members that show reactions. In some aspects, the layout updater 128 inserts names of the audience members and one or more types of reactions. Types of reactions may include smiles, downturned mouth, open mouth, brow furrow, brow risen, eye closed, and the like. In some other aspects, the layout updater 128 updates the layout of the display screen without indicating types of reaction; by avoiding labeling the inferred reactions, the disclosed technology empowers the presenter to make his/her own personal interpretations based on the context and their experience with the audiences under the spotlight. This way, the real-time, expressive-driven spotlight facilitates audience responses to the presenter of the online presentation to more closely resemble the in-person presentation environment. In aspects the online meeting server 120 highlights the one or more audience members that indicate reactions. In some aspects, highlighting the one or more audience members may include placing spotlights on the one or more audience members. Highlighting the one or more audience members with reactions is not limited to visually placing spotlights and displaying videos of the one or more audience members. For example, highlighting may include notifying the presenter by enhanced markings on indications (e.g., icons) corresponding to the one or more audience members. Some other examples of highlighting may use audio notifications about the one or more audience members to the presenter.

The spotlight audience server 140 determines one or more audience members for spotlighting during an online meeting. In particular, the spotlight audience server 140 determines the one or more audience members by extracting features (e.g., facial and head gestures) of audiences of the online meeting and classifying the features into one or more classes of expressive reactions. In aspects, the spotlight audience server 140 includes audience video receiver 142, feature extractor 144, expressiveness score generator 146, and spotlight audience determiner 148. The audience video receiver 142 receives video frames and/or other data associated with respective audiences of an online meeting. In aspects, the audience video receiver 142 may receive the data periodically (e.g., every 15 seconds) to dynamically determine spotlight audience members, causing the online meeting server 120 to dynamically update the spotlighting for the presenter during the online meeting.

The feature extractor 144 extracts one or more features of respective audience members of the online meeting. The one or more features may include face and landmarks (e.g., relevant face areas (e.g., eyebrows, eyes, a nose, a mouth, an orientation of the head). Once the feature extractor detects a face in a given video frame, the feature extractor 144 classifies facial expressions. For example, the feature extractor 144 uses a Convolutional Neural Network (CNN) for a classifier to estimate facial expressions. The feature extractor 144 estimates states including downturned mouth, eyes close, smiles, and mouth open. Additionally or alternatively, the feature extractor 144 uses a neural network classifier that detect the brow furrowing expression. The neural networks with models provide a probabilistic confidence value indicating the absence or presence of certain expressions.

Additionally or alternatively, the feature extractor 144 uses a Hidden Markov Model (HMM) to determine probabilities of the head nod and head shake gestures. In particular, the HMM may use the head yaw rotation value to detect head shakes, and the head Y-position of the facial landmarks to detect head nods over time. In aspects, a head gesture may include at least one of a head shake gesture or a head nod.

The expressiveness score generator 146 generates expressiveness scores for respective audience members of the online meeting. In particular, the expressiveness score generator 146 uses a degree of likelihood for the audiences to indicate each of the features associated with reactions. In aspects, the expressiveness score generator 146 generates the expressiveness scores using a weighted average of extracted features. In some aspects, less preferred responses (e.g., downturned mouth and neutral face) receive lower weights and more preferred responses (e.g., brow furrow and head-nods) receive higher weights. In some other aspects, the expressiveness score generator 146 generates expressiveness scores in at a time interval that the audience video receiver 142 receives video frames of the respective audience members. In some aspects, the time interval of generating expressiveness scores is appropriately short to enable spotlighting as many relevant behaviors as possible while long enough for avoiding situation where the frequent update of spotlighting audience members is not too distracting to the presenter.

The spotlight audience determiner 148 determines one or more audiences to apply the spotlight. In aspects, the spotlight audience determiner 148 determines an audience member with the highest expressiveness score for spotlighting. In some other aspects, the spotlight audience determiner 148 determines a predetermined number of audience members with top expressiveness scores as the spotlight audience member. In aspects, the spotlight audience determiner 148 transmits identity of the audience members for spotlighting to the online meeting server 120.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
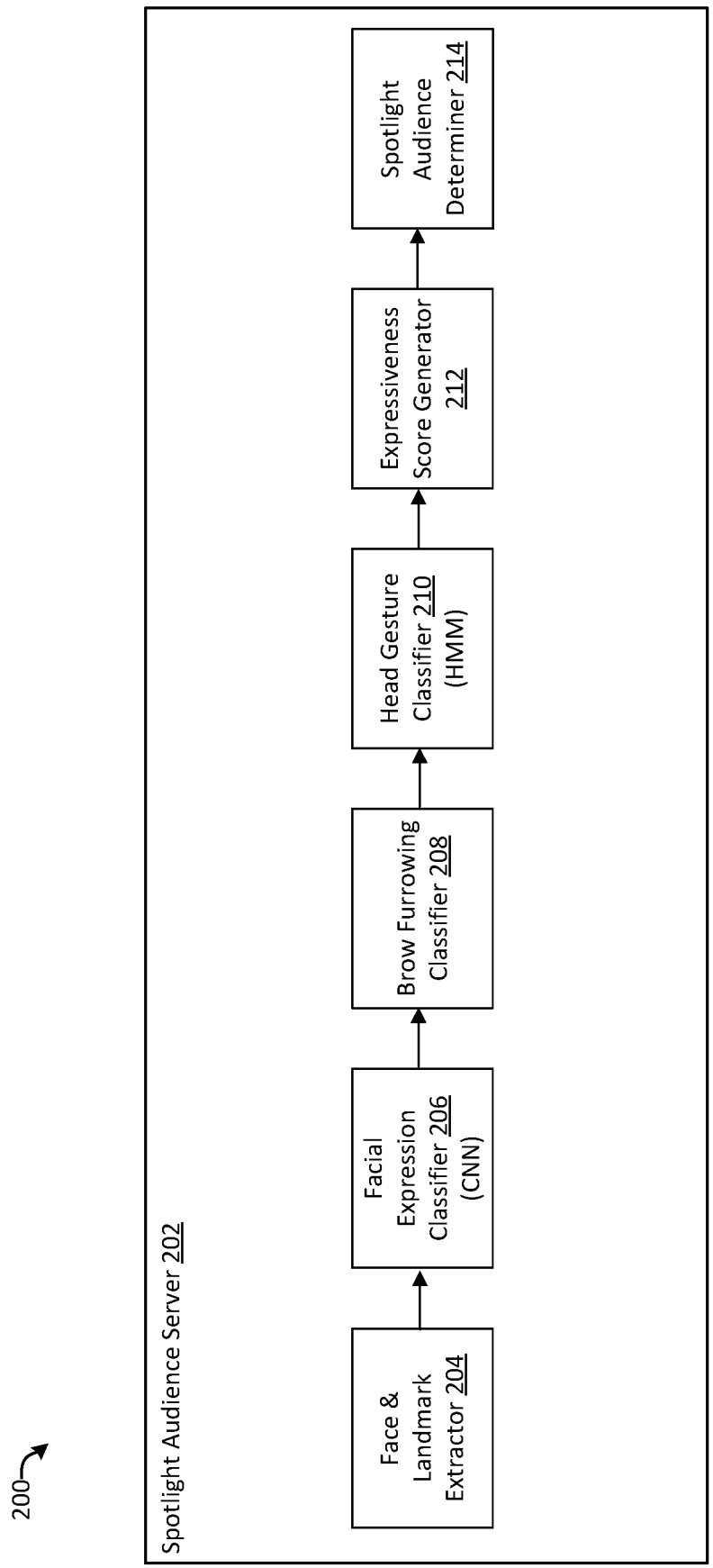
FIG. 2 illustrates an overview of an example spotlight audience server in accordance with aspects of the present disclosure.

FIG. 2 illustrates an example of the spotlight audience server in accordance with the aspects of the present disclosure. The spotlight audience server 202 (e.g., the spotlight audience server 140 as shown in FIG. 1) includes face & landmark extractor 204, facial expression classifier 406, brow furrowing classifier 208, head gesture classifier 210, expressiveness score generator 212, and spotlight audience determiner 214.

The face and landmark extractor 204 detect faces in a video frame and identifies and extract relevant face areas (e.g., eyes, nose, and mouth) as landmark. Additionally or alternatively, the face and landmark extractor 204 identifies and extract head pose orientation (e.g., yaw and roll).

The facial expression classifier 206 classifies the face into one or more classes of facial expressions. In aspects the facial expression classifier 206 uses a convoluted neural network (CNN) for classifying the face into one or more types of facial expressions. Examples of the types of facial expressions may include smiles, downturned mouth, mouth open, brow furrow, and brow raiser. In aspects, a trained CNN takes a set of pixels of the video frame with a face of an audience as input and classifies the face into one or more types of facial expressions after processing multiple layers of the CNN.

Additionally or alternatively, the brow furrowing classifier 208 classifies a video frame of a face into a face with furrowed brow. The furrowed brow may indicate a confused facial expression. The brow furrowing classifier 208 uses a CNN that is trained with sample data of the furrowed brow. Highlighting an audience member with confused expression may help the presenter address potential issues that may be confusing the audience members thereby improving the presentation.

The head gesture classifier 210 classifies a video of a face into one or more types of head gestures (e.g., the head nod and head shake gestures). In aspects, the head gesture classifier 210 uses a Hidden Markov Model (HMM) to determine probabilities of the head nod and head shake gestures. In particular, the HMM uses the head yaw rotation value to determine head shakes. The HMM uses the head Y-position of the facial landmarks to detect head nods over time. Presence of head gestures by the audience members helps determine reactions by the audiences during the online meeting.

Expressiveness score generator 212 generates expressiveness scores for respective audience members. In aspects, the facial expression classifier 206, the brow furrowing classifier 208, and the head gesture classifier 210 generate a degree of likelihood where an audience is showing respective types of reactions. The expressiveness score generator 212 generates an expressiveness score for an audience member by taking a weighted average of scores among the types of reactions.

The spotlight audience determiner 214 determines one or more audience members for spotlights. In aspects, the spotlight audience determiner 214 determines one or more audience members who indicate the most expressive reaction to the presentation. In some aspects, the spotlight audience determiner 214 updates determinations in a periodic basis (e.g., every 15 seconds). In aspects, the spotlight audience determiner 214 ranks individual audience members in the order of reactions.

Figure 3:
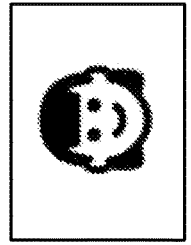
FIG. 3 illustrates an example of generating expressiveness scores for audiences in accordance with aspects of the present disclosure.
Figure 3:
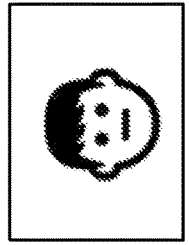
Figure 3:
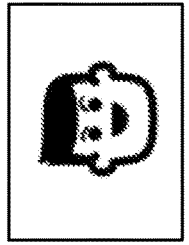
Figure 3:
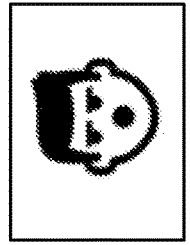

FIG. 3 illustrates an example data associated with expressiveness scores for audience members of an online meeting in accordance with aspects of the present disclosure. The example 300 includes video frames of four exemplar audience members (i.e., Alice, Bob, Charley, and David), scores for respective types of reaction and the overall expressiveness scores for the respective exemplar audience members.

The example 300 includes video frames for four audience members (e.g., Alice, Bob, Charlie, and David) for an online meeting. As a result of the classifications of facial expressions and head gestures, the expressiveness scores 320 table includes scores associated with various types of reactions for the respective audience members. Each type includes a weight for use in determining weighted average scores as expressiveness scores. For example, respective types of smiles, 324, downturned mouth 326, mouth and eyes wide open 328, brow furrow 330, and head-nod 332 have weight values of 3, 5, 5, 3, and 3.

For example, Alice has a smile score of 5, a downturned mouth score of 0, a mouth open score of 0, a brow furrow score of 0, and head-nod score of 3, thus the total score 334 of 24, and a weighted average score 336 of 6. Bob has a smile score of 0, a downturned mouth score of 0, a mouth open score of 0, a brow furrow score of 0, and head-nod score of 0, thus the total score of 0, and a weighted average score of 0. Charlie has a smile score of 8, a downturned mouth score of 0, a mouth open score of 0, a brow furrow score of 1, and head-nod score of 5, thus the total score of 53, and a weighted average score of 10.5. David has a mouth open score of 0, a downturned mouth score of 3, a mouth open score of 2, a brow furrow score of 3, and head-nod score of 1, thus the total score of 37, and a weighted average score of 9.3. In aspects, individual scores are in a scale from zero for no indication and ten for the most relevant. Scaling of the scores and weights is not limited to the example.

In the example 300 based on the respective video frames, Charlie indicates the highest expressiveness scores among the four audience members. Accordingly, the spotlight audience determiner (the spotlight audience determiner 148 as shown in FIG. 1 and the spotlight audience determiner 214 as shown in FIG. 2) determines Charlie as the audience member to inform for highlighting. Results from the classifications and the overall expressiveness scores change over time as facial expressions of the audience members in the video frames in subsequent time changes. In aspects, types with less preferred responses (e.g., sadness and neutral) are associated with lower weights while more preferred responses carry higher weights in determining the expressiveness score.

FIG. 4A illustrates an example display of an online meeting for a presenter in accordance with aspects of the present disclosure. The sample display 400A includes a window 402A of an online (i.e., virtual) meeting application. The window 402A includes a sub window 404A that displays an audience member under the spotlight 408A. The spotlight 408A is on Charlie, who has the highest expressiveness score at a time (e.g., at the present time) during the online meeting (e.g., the expressiveness score 10.5 as shown in FIG. 3). A sub window 406A indicates a presentation slide that the presenter is using for the online presentation. In aspects, the presenter sees Charlie with a smile as the presenter makes the online presentation. The presenter may feel confidence by seeing the smile and may reach out to Charlie and solicit the audience to positively involve in the presentation, for example.

FIG. 4B illustrates another example display of an online meeting for a presenter in accordance with aspects of the present disclosure. The sample display 400B includes a window 402B of an online (i.e., virtual) meeting application. The window 402B includes a first sub window 404B and a second sub window 410B, each displaying distinct audience members under the spotlight 408B: Charlie and David. The example 400B displays an audience member with the highest expressiveness score and another audience member with the second highest expressiveness score at a time during the online meeting. (e.g., the expressiveness score 10.5 for Charlie and 9.3 for David as shown in FIG. 3). A sub window 406B indicates a presentation slide that the presenter is using for the online presentation. In aspects, the presenter sees Charlie with a smile and David with a brow furrow or perhaps downturned mouth as the presenter makes the online presentation. In aspects, the disclosed technology displays types of reactions; in some other aspects, the disclosed technology withhold and do not display the determined types to elicit the presenter to think and react as the presenter feels appropriate. In aspects, the presenter may pause the presentation and communicate with David if the audience is feeling any concern. The presenter may also contrast the feeling with Charlie's reactions. The presenter may then clarify issues and keep the presentation interactive and keep the audience engaged. The sub window 406B continues to display the presentation materials for the presenter to keep focused in the presentation while interacting with the audiences. In aspects, the disclosed technology updates the spotlight in a periodic basis (e.g., every 15 seconds) by reevaluating the expressiveness scores. In some other aspects, the disclosed technology may continuously monitor video frames with the audiences and provides the spotlight to specific audience members when an expressiveness score of an audience member deviates from scores of other audience members (e.g., an audience member with a value outside the standard deviation of the weighted average scores of respective audience members).

FIG. 5 is an example of a method for highlighting an audience member in accordance with aspects of the present disclosure. A general order of the operations for the method 500 is shown in FIG. 5. In aspects, the online meeting server (e.g., the online meeting server 120 as shown in FIG. 1) performs the method 500. Generally, the method 500 begins with start operation 502 and ends with end operation 512. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4A-B, 6A-B, 7, and 8A-B.

Following start operation 500, the method 500 begins with start operation 504, which starts an online meeting. In aspects, the online meeting includes an online presentation by a presenter. Transmit operation 506 transmit audience video data to the spotlight audience server (e.g., the spotlight audience server 140 as shown in FIG. 1). In aspects, the audience video data includes a set of video frames, which depict faces of respective audience members of the online meeting. In some aspects, the respective video frames correspond to a time instance or within a proximity of a time during the online meeting. In some other aspects, the transmit operation 506 may transmit the audience member video periodically in a predetermined time period (e.g., every 15 seconds) or as triggered by the online meeting presenter and/or audience members, or one or more parts of the system (e.g., the example system 100 as shown in FIG. 1).

In aspects, a bot associated with the online meeting server 120 (the online meeting server 120 as shown in FIG. 1) may automatically capture and transmit, as the transmit operation 506, the audience member video data. In some other aspects, the spot-light audience server 140 may periodically request for audience member video data. The transmit operation 506 may transmit the audience video data in response to the periodic request.

Receive operation 508 receives information associated with one or more audience members for highlighting. In aspects, the receive operation 508 receives the one or more audience members from the spotlight audience server. The one or more audience members indicate reactions as determined based on the transmitted audience video.

Update operation 510 updates a layout of the spotlight audience member in the window for the online meeting for the presenter. The updated layout includes the received one or more audience members under the spotlight. In some aspects, the indications of the one or more audience members under the spotlight may be conveyed to participants (e.g., presenters and audience) of the online meeting. The disclosed technology may determine whom to convey the audience under the spotlight based on system configurations and preferences by the participants. The method 500 ends with the end operation 512.

As should be appreciated, operations 502-512 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6A is an example of a method for determining audience under the spotlight in accordance with aspects of the present disclosure. A general order of the operations for the method 600A is shown in FIG. 6A. Generally, the method 600A begins with start operation 602 and ends with end operation 614. The method 600A may include more or fewer steps or may arrange the order of the steps differently than those shown in FIG. 6A. The method 600A can be executed as a set of computer-executable instructions executed by a computer system and encoded or stored on a computer readable medium. Further, the method 600A can be performed by gates or circuits associated with a processor, an ASIC, an FPGA, a SOC or other hardware device. Hereinafter, the method 600A shall be explained with reference to the systems, components, devices, modules, software, data structures, data characteristic representations, signaling diagrams, methods, etc., described in conjunction with FIGS. 1, 2, 3, 4A-B, 5, 6B, 7, and 8A-B.

Following start operation 602, the method 600A begins with receive operation 604, which receives audience video or data associated with audience members of the online meeting. In aspects, the audience member video includes a set of video frames, which depict faces of respective audience members of the online meeting. In some aspects, the respective video frames correspond to a time instance or within a proximity of a time during the online meeting.

Extract operation 606 extracts one or more features associated with reactions based on facial expressions and head gestures of the audience members in the received audience member video frame. The extract operation 606, which is indicated by the indicator 'A', may include a series of operations for classifying faces and heads in the video frame into types of reactions.

Generate operation 608 generates an expressiveness score for one or more audience members of the online meeting. The generate operation 608 may include, for example, determining a weighted average of values associated with likelihood of the respective audience members depicting specific types of reactions. The respective types of reactions may include respective weights to enable influencing one type over other types in generating expressiveness scores.

Select operation 610 selects one or more audience members to highlight or placing spotlights. In aspects, the select operation 610 may determine one audience member at a time. In some other aspects, more than one audience members may be selected as being expressive.

Transmit operation 612 transmits information associated with one or more audience members to highlight (e.g., spotlight). In aspects, the transmit operation 612 transmit the information to the online meeting server 120, causing the online meeting server 120 to update the screen display for the presenter of the meeting to indicate the audience member(s) under the spotlight. In aspects, highlighting select audience members may include placing a spotlight by displaying a video feed of the select audience members with reactions on the screen display for the presenter. The end operation 614 ends the method 600A. As should be appreciated, operations 602-614 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6B is an example of a method for generating an expressiveness score for audience members in accordance with aspects of the present disclosure. A general order of the operations for the method 600B is shown in FIG. 6B. Generally, the method 600B begins with start operation 650 and ends with end operation 662. The method 600B may include more or fewer steps or may arrange the order of the steps differently than those shown in FIG. 6B. The method 600B can be executed as a set of computer-executable instructions executed by a computer system and encoded or stored on a computer readable medium. Further, the method 600B can be performed by gates or circuits associated with a processor, an ASIC, an FPGA, a SOC or other hardware device. Hereinafter, the method 600B shall be explained with reference to the systems, components, devices, modules, software, data structures, data characteristic representations, signaling diagrams, methods, etc., described in conjunction with FIGS. 1, 2, 3, 4A-B, 5, 6A, 7, and 8A-B.

Following start operation 650, the method 600B begins with extract operation 652, which extracts face and landmarks (e.g., facial landmarks) of the face from a video frame including the face of an audience member of the online meeting. The landmarks include relevant face areas (e.g., eyebrows, eyes, a nose, a mouth, an orientation of the head). The extract operation 652 determines regions of interests in the video. Additionally or alternatively, the extract operation 652 identifies head pose orientation (e.g., yaw and roll). In aspects, one or more classifiers for predicting reactions may use the head pose orientations among input to perform inference. In aspects, the extract operation 652 may crop the regions of interests for use as input to subsequent classify operations (e.g., the classify operations 652-658).

Classify operation 654 classifies facial expressions of an audience member based on the video frame with the regions of interest. In aspects, the classify operation 654 uses a convolutional neural network (CNN) to infer facial expressions of the audience. The CNN has been trained based on training data for types (i.e., categories) of facial expressions including reactions. Types of reactions may include smiles, downturned mouth, mouth and eye wide open, and the like.

Classify operation 656 detects and classifies a face with furrowed brow for enhancing accuracy of inferring confusion as a type of reactions. The classify operation 656 may use a convolutional neural network to perform inferences based on the regions of interest as extracted from the video frame. The CNN may be pre-trained using training data that correctly depict furrowed brows for respective types of reactions. In aspects, the classify operation 656 may use the same CNN as the classify operation 654 or a distinct CNN.

Classify operation 658 classifies head gesture of the audience members based on the regions of interests as extracted from video frames. The classify operation 658 determines probabilities of the head nod and head shake gestures, for example. In aspects, the classify operation 658 use a Hidden Markov Model (HMM) takes the head yaw rotation value as input to detect head shakes. Additionally or alternatively, the HMM takes the head Y-position of the facial landmarks as input to detect a head nod over time. In aspects, the head gesture includes at least one of the head nod or head shake gesture.

In aspects, models used for one or more of the classify operations 654-656 provide probabilistic confidence values including an extreme value associated with the absence (e.g., zero) or presence (one) of respective expressions. In some other aspects, the probabilistic confidence value may be a value between the two extreme values. In yet some other aspects, the probabilistic value is not limited to be between zero and one but may take a form in a predetermined range of numbers (e.g., whole numbers or fractions).

Generate operation 660 generates an expressiveness score for the audience member. In aspects, the generate operation 660 adds the probabilistic confidence values or scores (e.g., the scores associated with respective types of reactions as shown in FIG. 3) and determines a weighted average as the expressiveness score for the audience member. Weight values for the respective types of reactions may be predetermined. In some aspects, higher the expressiveness score is, the audience member has shown his/her reaction more explicitly and strongly.

The operations 652-660 correspond to an indicator 'A' that corresponds to the indicator 'A' in FIG. 6A. The method 600B ends with the end operation 662. As should be appreciated, operations 650-662 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes an audience video receiver 722, a feature extractor 724, an expressiveness score generator 726, and a spotlight audience determiner 728, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., as an operator of client devices and the servers) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., the RAN servers 116 and the servers 134, and other servers as shown in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and computer-implemented methods for highlighting select audience with reactions to presentations during an online meeting according to at least the examples provided in the sections below. As will be understood from the foregoing disclosure, one aspect of the technology relates to a computer-implemented method. The method comprises receiving data associated with a plurality of audience members participating in an online presentation; extracting, from the received data, one or more features associated with a reaction made by one or more of the plurality of audience members; generating at least one expressiveness score based on the reaction made by the one or more of the plurality of audience members; selecting, based on the at least one expressiveness score, a member of the plurality of audience members to highlight; and transmitting information associated with the selected member of the plurality of audience members to cause an online meeting application to highlight a display of the selected member of the plurality of audience members to a presenter of the online meeting. The one or more features associated with the reaction made by the one or more of the plurality of audience members comprises one or more of smiles, downturned mouth, mouth open, and closed eyes. The method further comprises causing the online meeting application to periodically update, based on a predetermined time interval, the display of the selected member of the plurality of audience members. The method further comprises causing the online meeting application to periodically update, based on a predetermined time interval, the display of the selected member of the plurality of audience members. The method further comprises determining a first probabilistic score associated with a facial expression associated with a reaction made by an audience member of the plurality of audience members through classification; determining a second probabilistic score associated with a furrowed brow by the audience member; determining a third probabilistic score associated with a head gesture made by the audience member; and generating, based at least on a combination of the first probabilistic score, the second probabilistic score, and the third probabilistic score, an expressiveness score associated with the audience member. The received data associated with the audience member includes a video frame, and wherein determining the first probabilistic score associated with the facial expression uses a convolutional neural network (CNN) with one or more regions of interests in the video frame as input. The determining the third probabilistic score associated with the head gesture uses a Hidden Markov Model (HMM). The method further comprises determining, by the CNN, a head yaw rotation value and a Y-position of at least one facial landmark; determining, by the HMM, using the head yaw rotation value a head shake gesture; and determining, by the HMM, using the Y-position a head nod over time. The second probabilistic score associated with a furrowed brow corresponds to a degree of confusion shown by the audience member. The highlighting the display of the selected member of the plurality of audience members comprises displaying live video data including placing a spotlight on the selected member.

Another aspect of the technology relates to a system for displaying reactive audience under spotlight in an online meeting. The system comprises a processor; and a memory storing computer-executable instructions that when executed by the processor cause the system to: receive data associated with a plurality of audience members participating in an online presentation; extract, from the received data, one or more features associated with a reaction made by one or more of the plurality of audience members; generate at least one expressiveness score based on the reaction made by the one or more of the plurality of audience members; select, based on the at least one expressiveness score, a member of the plurality of audience members to highlight; and transmit information associated with the selected member of the plurality of audience members to cause an online meeting application to highlight a display of the selected member of the plurality of audience members to a presenter of the online meeting. one or more features associated with the reaction made by the one or more of the plurality of audience members comprises one or more of smiles, downturned mouth, and brow furrow. The computer-executable instructions when executed further cause the system to: cause the online meeting application to periodically update, based on a predetermined time interval, the display of the selected member of the plurality of audience members. The computer-executable instructions when executed further cause the system to: determine a first probabilistic score associated with a facial expression associated with a reaction made by an audience member of the plurality of audience members through classification; determine a second probabilistic score associated with a furrowed brow by the audience member; determine a third probabilistic score associated with a head gesture made by the audience member; and generate, based at least on a combination of the first probabilistic score, the second probabilistic score, and the third probabilistic score, an expressiveness score associated with the audience member. The received data associated with the audience member includes a video frame, and wherein determining the first probabilistic score associated with the facial expression uses a convolutional neural network (CNN) with one or more regions of interests in the video frame as input. The determining the third probabilistic score associated with the head gesture uses a Hidden Markov Model (HMM).

In still further aspects, the technology relates to a computer storage media storing computer-executable instructions. The computer-executable instructions that when executed by a processor cause a computer system to receive data associated with a plurality of audience members participating in an online presentation; extract, from the received data, one or more features associated with a reaction made by one or more of the plurality of audience members; generate at least one expressiveness score based on the reaction made by the one or more of the plurality of audience members; select, based on the at least one expressiveness score, a member of the plurality of audience members to highlight; and transmit information associated with the selected member of the plurality of audience members to cause an online meeting application to highlight a display of the selected member of the plurality of audience members to a presenter of the online meeting. The one or more features associated with the reaction made by the one or more of the plurality of audience members comprises one or more of smiles, downturned mouth, and brow furrow. The computer-executable instructions when executed further cause the system to cause the online meeting application to periodically update, based on a predetermined time interval, the display of the selected member of the plurality of audience members. The computer-executable instructions when executed further cause the system to determine a first probabilistic score associated with a facial expression associated with a reaction made by an audience member of the plurality of audience members through classification; determine a second probabilistic score associated with a furrowed brow by the audience member; determine a third probabilistic score associated with a head gesture made by the audience member; and generate, based at least on a combination of the first probabilistic score, the second probabilistic score, and the third probabilistic score, an expressiveness score associated with the audience member. The head gesture includes at least one of a head shake gesture or a head nod. The received data associated with the audience member includes a video frame, and wherein determining the first probabilistic score associated with the facial expression uses a convolutional neural network (CNN) with one or more regions of interests in the video frame as input. The determining the third probabilistic score associated with the head gesture uses a Hidden Markov Model (HMM).

Any of the one or more above aspects in combination with any other of the one or more aspect. Any of the one or more aspects as described herein.

What is claimed is:

1. A computer-implemented method comprising:
   receiving data of a video stream, the data associated with a plurality of audience members participating in an online presentation;
   deriving, from the received data, a plurality of features-associated with a reaction made by one or more of the plurality of audience members, wherein the deriving a plurality of features comprises:
   determining, via an image processing neural network, a head yaw rotation value associated with a head gesture in the video stream; and
   inputting the head yaw rotation value into a yaw-detection model to determine the reaction comprises a head shake gesture;
   generating at least one expressiveness score based on the reaction made by the one or more of the plurality of audience members, the expressiveness score being generated using a combination of the plurality of features, with one or more features of the plurality of features that are pre-defined as being less-preferred for their conveying of negative engagement by the one or more of the plurality of audience members being weighted less than one or more other features of the plurality of features that are pre-defined as being more-preferred for their conveying of positive engagement by the one or more of the plurality of audience members;
   selecting, based on the at least one expressiveness score, a member of the plurality of audience members to highlight; and
   transmitting information associated with the selected member of the plurality of audience members to cause an online meeting application to highlight a display of the selected member of the plurality of audience members to a presenter of the online meeting.

2. The computer-implemented method of claim 1, wherein the plurality of features associated with the reaction made by the one or more of the plurality of audience members comprises one or more of smiles, downturned mouth, mouth open, and closed eyes.

3. The computer-implemented method of claim 1, the method further comprising:
   causing the online meeting application to periodically update, based on a predetermined time interval, the display of the selected member of the plurality of audience members.

4. The computer-implemented method of claim 1, the method further comprising:
   determining a first probabilistic score associated with a facial expression associated with a reaction made by an audience member of the plurality of audience members through classification;
   determining a second probabilistic score associated with a furrowed brow by the audience member;
   determining a third probabilistic score associated with the head shake gesture; and
   generating, based at least on a combination of the first probabilistic score, the second probabilistic score, and the third probabilistic score, an expressiveness score associated with the audience member.

5. The computer-implemented method of claim 4, wherein the received data associated with the audience member includes a video frame, and wherein determining the first probabilistic score associated with the facial expression uses the image processing neural network with one or regions of interests in the video frame as input.

6. The computer-implemented method of claim 5, wherein determining the third probabilistic score associated with the head shake gesture uses the yaw-detection model, and wherein the yaw-detection model is a Hidden Markov Model (HMM).

7. The computer-implemented method of claim 6, further comprising:
determining, by the image processing neural network, a Y-position of at least one facial landmark; and
determining, by the yaw detection model, using the Y-position and the head yaw rotation value, a head nod over time.

8. The computer-implemented method of claim 6, wherein the second probabilistic score associated with a furrowed brow corresponds to a degree of confusion shown by the audience member.

9. The computer-implemented method of claim 1, wherein highlighting the display of the selected member of the plurality of audience members comprises displaying live video data including placing a spotlight on the selected member.

10. A system for displaying reactive audience under spotlight in an online meeting, the system comprising:
a processor; and
a memory storing computer-executable instructions that when executed by the processor cause the system to:
receive data associated with a plurality of audience members participating in an online presentation;
derive, from the received data, a plurality of features associated with a reaction made by one or more of the plurality of audience members, wherein the deriving a plurality of features comprises:
determining, via an image processing neural network, a head yaw rotation value associated with a head gesture in the video stream; and
inputting the head yaw rotation value into a yaw-detecting model to determine the reaction comprises a head shake gesture;
generate at least one expressiveness score based on the reaction made by the one or more of the plurality of audience members, the expressiveness score being generated using a combination of the plurality of features, with one or more features of the plurality of features that are pre-defined as being less-preferred for their conveying of negative engagement by the one or more of the plurality of audience members being weighted less than one or more other features of the plurality of features that are pre-defined as being more-preferred for their conveying of positive engagement by the one or more of the plurality of audience members;
select, based on the at least one expressiveness score, a member of the plurality of audience members to highlight; and
transmit information associated with the selected member of the plurality of audience members to cause an online meeting application to highlight a display of the selected member of the plurality of audience members to a presenter of the online meeting.

11. The system of claim 10, wherein the plurality of features associated with the reaction made by the one or more of the plurality of audience members comprises one or more of smiles, downturned mouth, and brow furrow.

12. The system of claim 10, the computer-executable instructions when executed further cause the system to:
cause the online meeting application to periodically update, based on a predetermined time interval, the display of the selected member of the plurality of audience members.

13. The system of claim 10, the computer-executable instructions when executed further cause the system to:
determine a first probabilistic score associated with a facial expression associated with a reaction made by an audience member of the plurality of audience members through classification;
determine a second probabilistic score associated with a furrowed brow by the audience member;
determine a third probabilistic score associated with the head shake gesture; and
generate, based at least on a combination of the first probabilistic score, the second probabilistic score; and the third probabilistic score, an expressiveness score associated with the audience member.

14. The system of claim 13, wherein the received data associated with the audience member includes a video frame, and wherein determining the first probabilistic score associated with the facial expression uses the image processing neural network with one or regions of interests in the video frame as input.

15. The system of claim 14, wherein determining the third probabilistic score associated with the head shake gesture uses the yaw-detection model, and wherein the yaw-detection model is a Hidden Markov Model (HMM).

16. A non-transitory computer readable storage media storing computer-executable instructions that when executed by a processor cause a computer system to:
receive data associated with a plurality of audience members participating in an online presentation;
derive, from the received data, a plurality of features associated with a reaction made by one or more of the plurality of audience members, wherein the deriving a plurality of features comprises:
determining, via an image processing neural network, a head yaw rotation value associated with a head gesture in the video stream; and
inputting the head yaw rotation value into a yaw-detecting model to determine the reaction comprises a head shake gesture;
generate at least one expressiveness score based on the reaction made by the one or more of the plurality of audience members, the expressiveness score being generated using a combination of the plurality of features, with one or more features of the plurality of features that are pre-defined as being less-preferred for their conveying of negative engagement by the one or more of the plurality of audience members being weighted less than one or more other features of the plurality of features that are pre-defined as being more-preferred for their conveying of positive engagement by the one or more of the plurality of audience members;
select, based on the at least one expressiveness score, a member of the plurality of audience members to highlight; and
transmit information associated with the selected member of the plurality of audience members to cause an online meeting application to highlight a display of the selected member of the plurality of audience members to a presenter of the online meeting.

17. The computer storage media of claim 16, wherein the plurality of features associated with the reaction made by the one or more of the plurality of audience members comprises one or more of smiles, downturned mouth, and brow furrow.

18. The computer storage media of claim 16, the computer-executable instructions when executed further cause the system to:
cause the online meeting application to periodically update, based on a predetermined time interval, the display of the selected member of the plurality of audience members.

19. The computer storage media of claim 16, the computer-executable instructions when executed further cause the system to:
determine a first probabilistic score associated with a facial expression associated with a reaction made by an audience member of the plurality of audience members through classification;
determine a second probabilistic score associated with a furrowed brow by the audience member;
determine a third probabilistic score associated with the head shake gesture; and
generate, based at least on a combination of the first probabilistic score, the second probabilistic score, and the third probabilistic score, an expressiveness score associated with the audience member.

20. The computer storage media of claim 19,
wherein determining the first probabilistic score associated with the facial expression uses the image processing neural network with one or more regions of interests in the video frame as input, and
wherein determining the third probabilistic score associated with the head shake gesture uses the yaw-detection model, and wherein the yaw-detection model is a Hidden Markov Model (HMM).

\* \* \* \* \*